(12) United States Patent
Harata et al.

(10) Patent No.: US 9,819,562 B2
(45) Date of Patent: Nov. 14, 2017

(54) GATEWAY DEVICE WITH PRIORITY ARBITRATION FUNCTION

(71) Applicant: DENSO CORPORATION, Kariya, Aichi-pref. (JP)

(72) Inventors: Yuzo Harata, Chiryu (JP); Mitsuyoshi Natsume, Hekinan (JP); Yasuyuki Takahashi, Okazaki (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 28 days.

(21) Appl. No.: 14/433,868

(22) PCT Filed: Oct. 4, 2013

(86) PCT No.: PCT/JP2013/005939
§ 371 (c)(1),
(2) Date: Apr. 7, 2015

(87) PCT Pub. No.: WO2014/057642
PCT Pub. Date: Apr. 17, 2014

(65) Prior Publication Data
US 2015/0281022 A1 Oct. 1, 2015

(30) Foreign Application Priority Data

Oct. 9, 2012 (JP) .................................. 2012-224392

(51) Int. Cl.
*H04L 12/26* (2006.01)
*H04L 12/28* (2006.01)
(Continued)

(52) U.S. Cl.
CPC ...... *H04L 43/0811* (2013.01); *H04L 12/2825* (2013.01); *H04L 12/4625* (2013.01);
(Continued)

(58) Field of Classification Search
None
See application file for complete search history.

(56) References Cited

U.S. PATENT DOCUMENTS

| 8,537,833 B2* | 9/2013 | Tzoreff ................. H04W 88/06 370/395.42 |
| 2009/0006626 A1* | 1/2009 | Yamagishi .......... H04L 12/5695 709/226 |
| 2015/0254909 A1 | 9/2015 | Harata et al. |

FOREIGN PATENT DOCUMENTS

| JP | 2003023440 A | 1/2003 |
| JP | 2006191339 A | 7/2006 |

(Continued)

OTHER PUBLICATIONS

Office Action dated Nov. 24, 2015, issued in the corresponding JP application No. 2012-224393 in Japanese with English translation.
(Continued)

*Primary Examiner* — Christopher Crutchfield
*Assistant Examiner* — Tito Pham
(74) *Attorney, Agent, or Firm* — Harness, Dickey & Pierce, P.L.C.

(57) ABSTRACT

A gateway device includes a request receiving portion receiving, from diagnosis purpose tools, diagnosis requests for performing malfunction diagnosis to an ECU of a vehicle, an outputting portion outputting the diagnosis request to an in-vehicle LAN, a response receiving portion receiving a diagnosis response output from the ECU to the in-vehicle LAN as a response to the diagnosis request, a transmitting portion transmitting the diagnosis response to corresponding diagnosis purpose tool, and an arbitration portion. When the request receiving portion receives a non-prioritized diagnosis request from a non-prioritized diagnosis purpose tool at a previous time and receives a prioritized diagnosis request from a prioritized diagnosis purpose tool (Continued)

before an end of the malfunction diagnosis requested by the non-prioritized tool, the arbitration portion cancels an output of the non-prioritized diagnosis request from the outputting portion cancels a transmission of the non-prioritized diagnosis response from the transmitting portion to the non-prioritized tool.

4 Claims, 2 Drawing Sheets

(51) Int. Cl.
*H04L 12/66* (2006.01)
*H04L 29/08* (2006.01)
*H04L 12/46* (2006.01)
*H04L 12/40* (2006.01)

(52) U.S. Cl.
CPC .............. *H04L 12/66* (2013.01); *H04L 67/12* (2013.01); *H04L 2012/40273* (2013.01)

(56) References Cited

FOREIGN PATENT DOCUMENTS

| | | |
|---|---|---|
| JP | 2006193919 A | 7/2006 |
| JP | 2006197017 A | 7/2006 |
| JP | 2006347333 A | 12/2006 |
| JP | 2007196971 A | 8/2007 |
| JP | 2008074124 A | 4/2008 |
| JP | 2012105082 A | 5/2012 |
| WO | WO-2014057643 A1 | 4/2014 |

OTHER PUBLICATIONS

Office Action dated Nov. 24, 2015, issued in the corresponding JP application No. 2012-224392 in Japanese with English translation.
International Search Report and Written Opinion (in Japanese with English Translation) for PCT/JP2013/005939, dated Jan. 14, 2014; ISA/JP.
International Search Report and Written Opinion (in Japanese with English Translation) for PCT/JP2013/005940, dated Jan. 14, 2014; ISA/JP.

* cited by examiner

GATEWAY DEVICE WITH PRIORITY ARBITRATION FUNCTION

CROSS REFERENCE TO RELATED APPLICATIONS

This application is a U.S. National Phase Application under 35 U.S.C. 371 of International Application No. PCT/JP2013/005939 filed on Oct. 4, 2013 and published in Japanese as WO 2014/057642 A1 on Apr. 17, 2014. This application is based on and claims the benefit of priority from Japanese Patent Application No. 2012-224392 filed on Oct. 9, 2012. The entire disclosures of all of the above applications are incorporated herein by reference.

TECHNICAL FIELD

The present disclosure relates to a gateway device that relays a communication between a diagnosis purpose tool and an electronic control unit (ECU) to be diagnosed.

BACKGROUND ART

Conventionally, a Controller Area Network (CAN) used in an on-board system is known as one of Local Area Network (LAN) communication standards. Usually, at a dealership utility, a malfunction diagnosis (diagnosis) for diagnosing an ECU included in an on-board system is performed by connecting a service tool to CAN of the vehicle using a data link connector.

As well known, an ECU is able to wirelessly communicate with an external device. For example, an ECU that is communicable with a mobile device receives a remote operation via the mobile device, and functions as a remote operation device (refer to patent literature 1).

Further, an ECU, such as a Data Communication Module (DCM), is able to access to a wireless communication network and perform a wireless communication with a center positioned outside of the vehicle. The ECU performs a malfunction diagnosis to each of multiple ECUs that configure the on-board system using CAN of the vehicle.

Further, a technology in which the malfunction diagnosis to the ECU is carried out by both the service tool and the DCM is well known. In this case, while one of the service tool or the DCM performs the diagnosis malfunction to an ECU, the other one of the service tool or the DCM may request the malfunction diagnosis to the same ECU. In this case, as an arbitration method, the malfunction diagnosis started at a previous time may be carried out with a higher priority. After the malfunction diagnosis started at the previous time is ended, the malfunction diagnosis requested at a later time can be started under a specific rule (first come first processed).

However, in CAN, a maximum data size that can be transmitted in single frame is 8 bytes. Thus, when a data having a size larger than 8 bytes needs to be transmitted using CAN, the data is divided into multiple data segments and the multiple data segments are transmitted in predetermined order as multiple frames. The multiple frames configure one message. Thus, the data having a size larger than 8 bytes needs a relatively long time to be transmitted.

For example, suppose that a person visits a dealership utility by driving a vehicle and applies for a malfunction diagnosis service for diagnosing ECUs of the vehicle using the DCM. In this case, a message having a large data size is transmitted between the ECU and the DCM. Thus, until an end of the message transmitting, the malfunction diagnosis to the same ECU cannot be started using the service tool. Thus, the person who applied for the diagnosis service has to wait until the end of the message transmitting.

As described above, the first come first processed may cause some inconvenience to the customers of the diagnosis service. Thus, in some cases, the diagnosis needs to be carried out in a different rule other than the first come first processed rule. However, when each of the ECUs equipped to the vehicle is required to perform the switchover of the diagnosis processing rule, the process carried out in each ECU becomes complicated. Nowadays, a vehicle has great number of ECUs. Thus, a substantially great development cost may be required for adding the switchover function of the diagnosis processing rule to each ECU equipped to the vehicle.

PRIOR ART LITERATURES

Patent Literature

[Patent Literature 1] JP 2006-347333 A

SUMMARY OF INVENTION

In view of the foregoing difficulties, it is an object of the present disclosure to provide a gateway device that is capable of arbitrating a diagnosis process for executing, to an ECU, a malfunction diagnosis requested by a specific diagnosis purpose tool with a higher priority without adding a complicated control process to the ECU.

According to a first aspect of the present disclosure, a gateway device includes a request receiving portion, an outputting portion, a response receiving portion, a transmitting portion, and an arbitration portion. The request receiving portion receives, from a first diagnosis purpose tool, a first diagnosis request that requests an execution of a malfunction diagnosis to an electronic control unit equipped to a vehicle. The request receiving portion further receives, from a second diagnosis purpose tool, a second diagnosis request that requests an execution of a malfunction diagnosis to the electronic control unit. One of the first diagnosis purpose tool or the second diagnosis purpose tool is defined as a prioritized tool and a remaining one of the first diagnosis purpose tool or the second diagnosis purpose tool is defined as a non-prioritized tool. The prioritized tool has a priority higher than a priority of the non-prioritized tool. One of the first diagnosis request or the second diagnosis request output from the prioritized tool is defined as a prioritized diagnosis request and a remaining one of the first diagnosis request or the second diagnosis request output from the non-prioritized tool is defined as a non-prioritized diagnosis request. The outputting portion outputs the first diagnosis request and the second diagnosis request received by the request receiving portion to an in-vehicle local area network to which the electronic control unit is connected. The response receiving portion receives a first diagnosis response and a second diagnosis response. The first diagnosis response is output from the electronic control unit to the in-vehicle local area network as a response to the first diagnosis request, and the second diagnosis response is output from the electronic control unit to the in-vehicle local area network as a response to the second diagnosis request. One of the first diagnosis response or the second diagnosis response output as a response to the prioritized diagnosis request is defined as a prioritized diagnosis response and a remaining one of the first diagnosis response or the second diagnosis response output as a response to the non-prioritized diagnosis request is defined as a non-prioritized diagnosis response. The transmitting portion transmits the first diagnosis response to the first diagnosis purpose tool as the response to the first diagnosis request and transmits the second diagnosis response to the second diagnosis purpose tool as the response to the second diagnosis request. When the request receiving portion receives the non-prioritized diagnosis request from the non-prioritized tool for the execution of the malfunction diagnosis to the electronic control unit at a previous time and receives the prioritized diagnosis request from the prioritized tool for the execution of the malfunction diagnosis to the electronic control unit before an end of the malfunction diagnosis requested by the non-prioritized tool at the previous time, the arbitration portion controls the outputting portion to cancel an output of the non-prioritized diagnosis request and controls the transmitting portion to cancel a transmission of the non-prioritized diagnosis response to the non-prioritized tool.

With above device, in the ECU, arbitration for carrying out a malfunction diagnosis requested by a specific diagnosis purpose tool can be carried out with a higher priority without adding a complicated control process to the ECU.

BRIEF DESCRIPTION OF DRAWINGS

The above and other objects, features and advantages of the present invention will become more apparent from the following detailed description made with reference to the accompanying drawings. In the drawings.

EMBODIMENTS FOR CARRYING OUT INVENTION

The following will describe embodiments of the present disclosure with reference to the drawings. In addition, specific embodiments of the present disclosure are not limited to the embodiments described below, and as long as the embodiment is within a technical scope of the present disclosure, any change or modification can be made to the embodiments of the present disclosure.

(Configuration)

Figure 1:
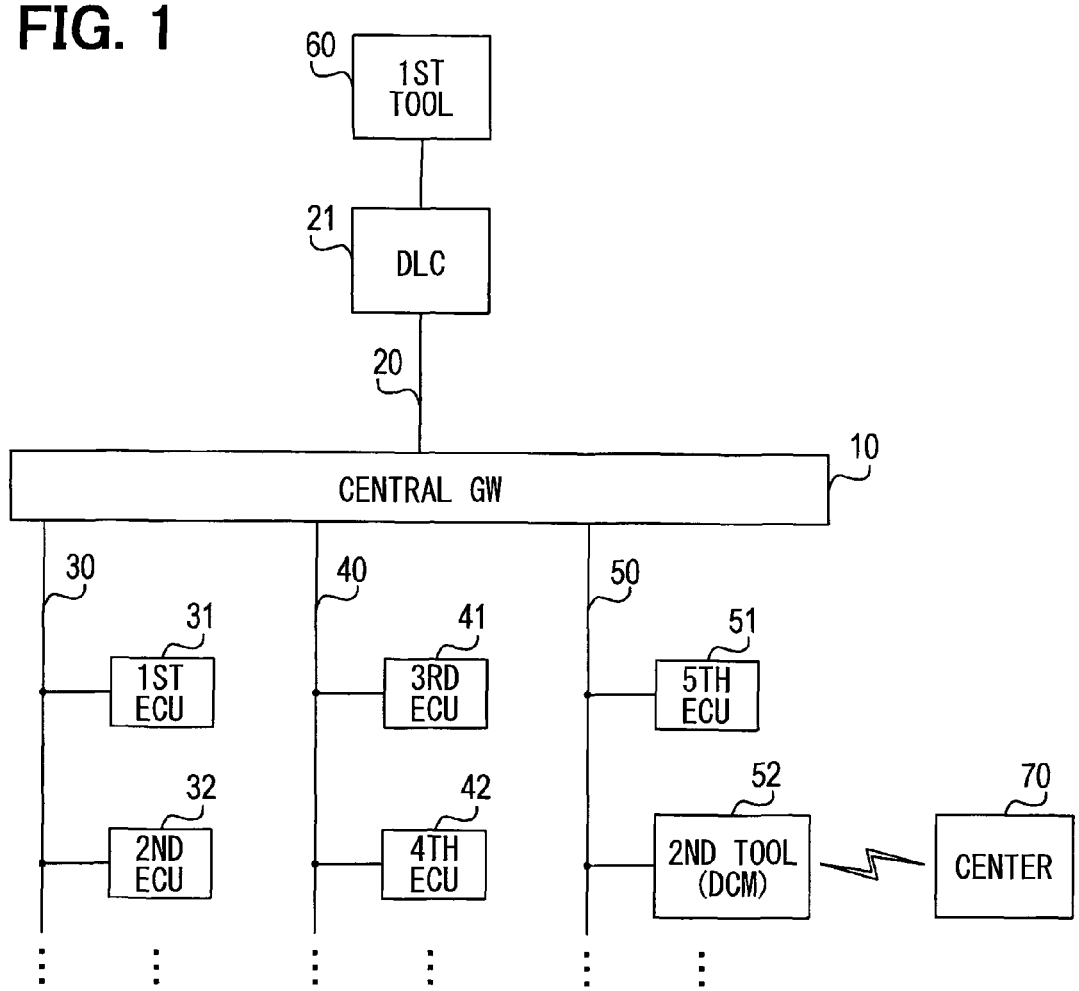
FIG. 1 is a block diagram showing a configuration of an on-board system including a gateway device according to an embodiment of the present disclosure.

FIG. 1 is a block diagram showing a configuration of an on-board system that includes a central gateway (CENTRAL GW) 10 and other components. The central gateway 10 is an example of a gateway device according to the present disclosure. Hereinafter, the central gateway 10 is described as central GW 10 for simplification.

The central GW 10 is connected to a first LAN (1ST LAN) 30, a second LAN (2ND LAN) 40, or the like. A first electronic control unit (1ST ECU) 31 and a second electronic control unit (2ND ECU) 32 are connected to the first LAN 30, which is an in-vehicle LAN. A third electronic control unit (3RD ECU) 41 and a fourth electronic control unit (4RD ECU) 42 are connected to the second LAN 40, which is an in-vehicle LAN. The central GW 10 is also connected to a third LAN (3RD LAN) 50. A fifth electronic control unit (5TH ECU) 51 and a Data Communication Module (DCM) 52 that is able to access to a wireless communication network are connected to the third LAN 50, which is an in-vehicle LAN. The central GW 10 relays a communication between different ECUs 31, 32, 41, 42, 51 that are connected to different LANs, respectively.

The central GW 10 may be configured as a gateway ECU, or may be configured as a specific purpose ECU that is used for a specific purpose, such as navigation or air conditioning.

In the present embodiment, each of the first LAN 30 to the third LAN 50 is configured as a Controller Area Network (CAN) as an example.

For example, the central GW 10 may be connected to a transmission path 20, which is configured as CAN. A data link connector (DLC) 21 is positioned in the transmission path 20. To the data link connector 21, a first diagnosis purpose tool (1ST TOOL) 60 can be temporarily connected for performing a malfunction diagnosis to each ECU 31, 32, 41, 42, 51. Hereinafter, the first diagnosis purpose tool 60 is referred to as a first tool 60 for simplification. For example, the first tool 60 may be provided by a service tool at a dealership utility, an authorized tool determined under a law or under a regulation for performing the malfunction diagnosis, or the like.

The first tool 60 is connected to the data link connector 21, and starts the malfunction diagnosis to a target ECU. At this time, the central GW 10, via the transmission path 20, receives a diagnosis request frame from the first tool 60, and transmits the received diagnosis request frame to the first to third LANs 30 to 50. The diagnosis request frame is a frame that instructs a malfunction diagnosis to the target ECU.

When the target ECU outputs, as a response to the diagnosis request frame, a diagnosis response frame to a corresponding LAN, which is one of the first to third LANs 30 to 50, the central GW 10 receives the diagnosis response frame and transmits the diagnosis response frame to the first tool 60 via the transmission path 20.

Thus, when the first tool 60 is connected to the data link connector 21, the first tool 60 is able to transmit or receive the diagnosis purpose frame to or from one of ECUs 31, 32, 41, 42, 51 included in the on-board system, via the central GW 10. With this configuration, the first tool 60 is able to perform the malfunction diagnosis to each of the ECUs.

In the present disclosure, the DCM 52 connected to the third LAN 50 functions as a second diagnosis purpose tool (2ND TOOL). Hereinafter, the second diagnosis purpose tool 52 is referred to as a second tool 52 for simplification. The second tool 52 is communicably connected with a center (CENTER) 70 (may be provided by a mobile phone or a smart phone) via a wireless communication network. The center 70 performs a malfunction diagnosis to the ECUs of the vehicle. The second tool 52 outputs a diagnosis request frame to the third LAN 50 when the malfunction diagnosis is requested by the center 70 or when a predetermined activation condition is satisfied in the second tool 52. The central GW 10 receives the diagnosis request frame and outputs the diagnosis request frame to the first and second LANs 30 and 40.

When a diagnosis response frame is output from one of the ECUs to the first or second LAN 30 or 40 as a response, the central GW 10 receives the diagnosis response frame and transmits the diagnosis response frame to the first LAN 50. The second tool 52 receives the diagnosis response frame, and transmits contents of the diagnosis response frame to the center 70.

As described above, the central GW 10 relays a transmission and receiving of the diagnosis purpose frame between the second tool 52 and one of the first or second ECU 30, 40 that is a target of the malfunction diagnosis. Herein, the second tool 52 performs the malfunction diagnosis in response to the instruction from the center 70 or in response to a satisfaction of the predetermined activation condition in the second tool 52. With this configuration, the center 70 is able to communicate with the ECUs via the second tool 52 and the central GW 10, and is able to perform the malfunction diagnosis to the ECUs.

Further, the second tool 52 is able to diagnose the ECU connected to the third LAN 50 by a direct communication using the third LAN 50 in response to the instruction from the center 70.

Figure 2:
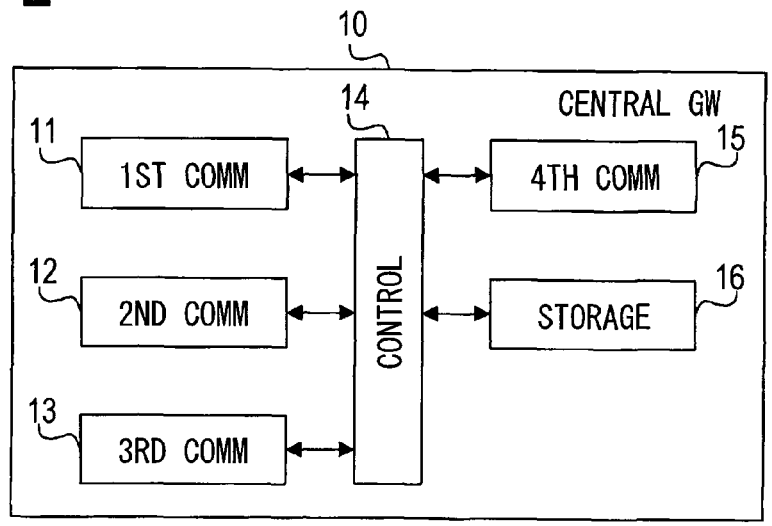
FIG. 2 is a block diagram showing a configuration of a central gateway.

The following will describe a configuration of the central GW 10 with reference to FIG. 2. The central GW 10 includes a first communication portion (1ST COMM) 11 that performs a communication via the first LAN 30, a second communication portion (2ND COMM) 12 that performs a communication via the second LAN 40, a third communication portion (3RD COMM) 13 that performs a communication via the third LAN 50, and a fourth communication portion (4TH COMM) 15 that performs a communication via the transmission path 20. The central GW 10 further includes a controller (CONTROL) 14 and a storage (STORAGE) 16. The storage 16 is provided by a volatile memory device that does not maintain stored information (such as, flash memory).

The controller 14 is configured with a well-known microcomputer as a main part. As well known, the microcomputer includes a Central Processing Unit (CPU), a Read Only Memory (ROM), a Random Access Memory (RAM), an Input/Output (I/O) and a bus line connects these components. The controller 14 controls operations of the central GW 10 by executing programs stored in the ROM.

(Operations)

The following will describe an arbitration process executed by the central GW 10 for arbitrating the malfunction diagnosis requested by the first tool 60 and the malfunction diagnosis requested by the second tool 52.

In CAN, the maximum data length which can be transmitted in one frame at one time is 8 bytes. When the size of the data to be transmitted by CAN exceeds 8 bytes, the data needs to be divided and transmitted in two or more frames by twice or more times in order to transmit the data as a message.

For example, International Organization for Standardization (ISO) 15765 standard defines a communication protocol of a network layer of CAN. Specifically, ISO 15765 defines four types of frames including a single frame (SF), a first frame (FF), a consecutive frame (CF), a flow control frame (FC), and time limits related transmitting or receiving of the frame between the tool and the ECU.

Further, ISO 14229 defines a communication protocol of an application layer of CAN. Specifically, ISO 14229 defines a specific rule (first come first processed) in a diagnosis process. Specifically, while an ECU receives, from a tool, a diagnosis request frame or a diagnosis request message (referred to as diagnosis request frame or the like for simplification hereinafter), if a different diagnosis request frame or the like is transmitted from a different tool, the ECU refuses to receive the diagnosis request frame or the like from the different tool and processes the diagnosis request frame received at a previous time with a higher priority under the first come first processed rule. For example, the ECU may transmit a Negative Response Code NRC, which requests for a resending of the diagnosis request frame or the like, as a response to the diagnosis request frame or the like transmitted from the different tool. The ECU refuses to receive a new diagnosis request frame or the like from the different tool until a receiving of the diagnosis request frame or the like transmitted from the one tool at the previous time is ended.

According to ISO 15765 standard, which defines the communication protocol of a network layer for a diagnosis use, when the ECU receives a new diagnosis request frame or the like from a different tool during a receiving of a diagnosis request frame or the like from one tool, the diagnosis request frame or the like being received by the ECU is abandoned and the receiving of the new diagnosis request frame or the like from the different tool is started.

Suppose that the application layer of the ECU 31, 32, 41, 42, 51 in the present embodiment has the first come first processed configuration defined under the communication protocol of a network layer for a diagnosis use. Further suppose that the second tool 52 transmits or receives frames to or from one of the ECUs 31, 32, 41, 42, 51 through the central GW 10 in response to the malfunction diagnosis instruction from the center 70. At this time, when the first tool 60 transmits the diagnosis request frame to the same target ECU, the frame is refused by the ECU and the malfunction diagnosis requested by the first tool 60 cannot be started.

The first tool 60 is usually provided by a diagnosis service tool used in a dealership utility. Thus, when the malfunction diagnosis requested by the first tool 60 is refused by the ECU and cannot be started promptly, other customers who applied for a diagnosis service of a vehicle have to wait in the dealership utility.

Regarding above problem, central GW 10 performs the arbitration when the malfunction diagnosis is requested by the first tool 60 during a frame transceiving between the second tool 52 and the ECU for the malfunction diagnosis.

Conventionally, an arbitration method in which CAN IDs are divided corresponding to different multiple tools and the malfunction diagnosis requested by the multiple tools can be simultaneously carried out to the diagnosis target is well known. In the present embodiment, the central GW 10 performs the arbitration in a different method.

By the arbitration method according to the present embodiment, the malfunction diagnosis being carried out by the second tool 52 is interrupted, and the malfunction diagnosis requested by the first tool 60 is started promptly.

Figure 3:
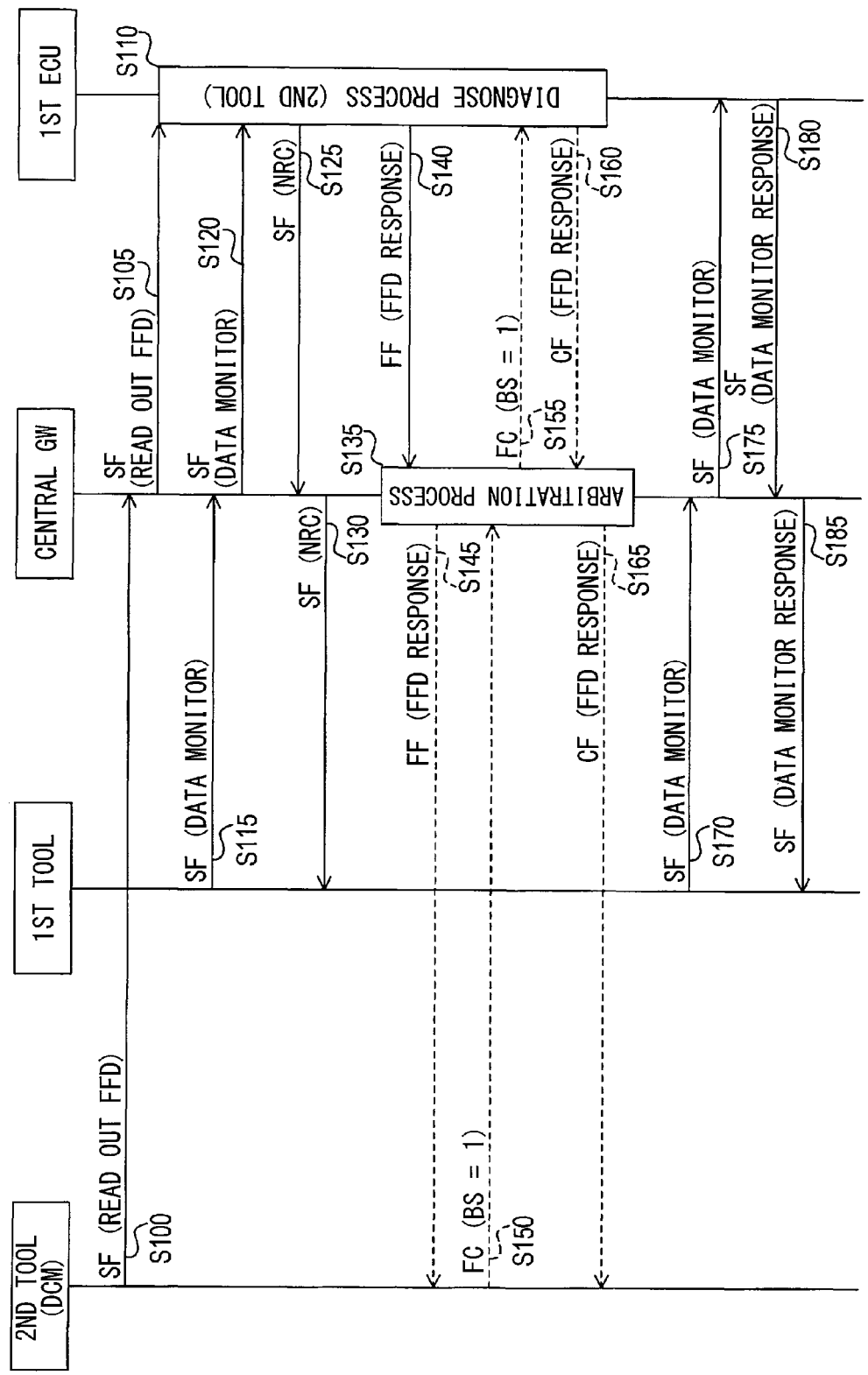
FIG. 3 is a flowchart showing a process that performs an arbitration for giving a higher priority to a malfunction diagnosis requested by a first tool.

The following will describe an arbitration process for giving a higher priority to the malfunction diagnosis requested by the first tool 60 with reference to FIG. 3.

In response to the instruction from the center 70, the second tool 52 outputs, to the third LAN 50, an SF of a freeze frame data (FFD) readout command that requests the first ECU 31 to provide the FFD (S100).

The FFD is a data that indicates a vehicle state when a malfunction occurs to the vehicle. Herein, the vehicle state may include a vehicle speed, an engine speed, or the like.

The controller 14 of the central GW 10 receives the FFD readout command via the third communication portion 13, and then, outputs the FFD readout command to the first and second LAN 30, 40 via the first and second communication portion 11, 12 (S105).

When the first ECU 31 receives the FFD readout command, the first ECU 31 starts the diagnosis process (S110), and reads out the FFD stored in a flash memory of the ECU 31. When the FFD has a data size larger than 8 bytes, the FFD is divided into multiple data segments each of which having a data size less than 8 bytes.

Suppose that, after the central GW 10 outputs the FFD readout command at S105, the first tool 60 outputs, to the transmission path 20, an SF of data monitoring command that instructs readout of data stored in a predetermined address of the memory of the ECU 31 (S115). The controller 14 of the central GW 10 receives the data monitoring command via the fourth communication portion 15, and outputs the data monitoring command to the first to third LANs 30 to 50 via the first to third communication portions 11 to 13 (S120).

The first ECU 31 receives the data monitoring command output to the first LAN 30. However, the first ECU 31 does not read out the information stored in the memory requested by the first tool 60 because the response to the FFD readout command requested by the second tool 52 has not been ended. As a response to the data monitoring command from the first tool 60, the first ECU 31 outputs, to the first LAN 30, an SF of NRC that requests for a resending of the data monitoring command after an elapse of a predetermined time period (S125).

The controller 14 of the central GW 10 receives the NRC via the first communication portion 11, and outputs the NRC to the transmission path 20 (S130). After receiving the NRC, the controller 14 of the central GW 10 performs an arbitration process for a predetermined period in order to interrupt the malfunction diagnosis being carried out by the second tool 52 and start the malfunction diagnosis requested by the first tool 60 with a higher priority (S135). During the arbitration process, the central GW 10 cancels a relay of the diagnosis purpose frame that is used for the malfunction diagnosis requested by the second tool 52 (a relay of the diagnosis purpose frame between the first ECU 31 and the second tool 52).

As another example, the controller 14 of the central GW 10 may cancel a relay of the data monitoring command transmitted from the first tool 60 at S115, and transmit NRC to the first tool 60 as a response to the data monitoring command. With this configuration, the central GW 10 is able to control the first tool 60 to resend the data monitoring command after an elapse of a predetermined time period.

The first ECU 31 generates an FF of FFD response so that the FFD response includes one of divided FFD data segments, and outputs the FFD response to the first LAN 30 (S140).

Suppose a case in which the central GW 10 does not perform the arbitration process. In this case, the second tool 52, the central GW 10, and the first ECU 31 operate in the following way (shown by dashed line arrows in FIG. 3).

When the controller 14 of the central GW 10 receives the FFD response, which is output from the first ECU 31 to the first LAN 30, the controller 14 of the central GW 10 outputs the FFD response to the third LAN 50 via the third communication portion 13 (S145).

When the second tool 52 receives the FFD response, which is output to the third LAN 50, the second tool 52 outputs an FC that defines a transmission order of the FFD response to the third LAN 50 (S150). In the present embodiment, as one example of the FC, block size is set equal to 1, that is, block size (BS)=1, and the second tool 52 is instructed to transmit one FFD response frame corresponding to the FC. However, the transmission order is not limited to this example.

When the controller 14 of the central GW 10 receives, via the third communication portion 13, the FC, which is output to the third LAN 50, the controller 14 of the central GW 10 outputs the FC to the first and second LANs 30, 40 via the first and second communication portions 11, 12 (S155).

When the first ECU 31 receives the FC, the first ECU 31 outputs a CF of FFD response to the first LAN 30 as a response (S160). The FFD response includes another data segment of the FFD. The controller 14 of the central GW 10 receives the FFD response via the first communication portion 11, and then, outputs the FFD response to the third LAN 50 via the third communication portion (S165).

When the central GW 10 performs the arbitration process, at S140, the central GW 10 cancels a relay of the FFD response transmitted from the first ECU 31 to the third LAN 50. That is, when the central GW 10 performs the arbitration process, the central GW 10 does not carry out the processes executed at S145 to S165.

Suppose that the central GW 10 starts the arbitration process at a later time in response to the receiving of the data monitoring command from the first tool 60. Herein, the later time is a time after the transmitting of the FFD response to the second tool 52 has been finished by the central GW 10 at S145. In this case, the second tool 52 outputs the FC as the response to the FFD response (S150). However, since the central GW 10 has started the arbitration process before receiving of the FC from the second tool 52, the central GW 10 cancels a relay of the FC to the first ECU 31.

Suppose that the central GW 10 starts the arbitration process at another later time in response to the receiving of the data monitoring command from the first tool 60. Herein, the later time is a time after the relay of the FC to the first ECU 31 has been carried out by the central GW 10 at S155. In this case, the first ECU 31 outputs the FFD response in response to the FC (S160). However, since the central GW 10 has started the arbitration process before receiving the FFD response from the first ECU 31, the central GW 10 cancels a relay of the FFD response to the second tool 52.

The second tool 52 waits for the FFD response from the first ECU 31 for a predetermined time period, and ends the malfunction diagnosis after an elapse of the predetermined time period. Similarly, the first ECU 31 waits for the FC, and ends the diagnosis process after a predetermined time period has elapsed from an outputting of the FFD response (S140).

The first tool 60 outputs the data monitoring command again to the transmission path 20 (S170) after an elapse of the predetermined time period from the receiving of the NRC from the central GW 10 at S130. The controller 14 of the central GW 10 receives the data monitoring command, and outputs the data monitoring command to the first to third LANs 30 to 50 (S175).

When the first ECU 31 receives the data monitoring command output to the first LAN 30, the first ECU 31 reads out the data stored in a region specified by the data monitoring command. Then, the first ECU 31 generates an SF of the data monitoring response so that the data monitoring response includes the readout data, and transmits the data monitoring response to the first LAN 30 (S180). The controller 14 of the central GW 10 receives the data monitoring response that is output to the first LAN 30, and outputs the data monitoring response to the transmission path 20 (S185) in order to relay the data monitoring response to the first tool 60.

(Advantages)

In the central GW 10 according to the present embodiment, when a diagnosis request frame is transmitted from the first tool 60 for performing the malfunction diagnosis to the target ECU during a malfunction diagnosis to the same target ECU by the second tool 52, the central GW 10 interrupts the relay of the diagnosis purpose frames between the second tool 52 and the target ECU.

With above configuration, the malfunction diagnosis being carried out by the second tool 52 is forcibly interrupted by the central GW 10 without adding an additional control process to each ECU 31, 32, 41, 42, 51 for interrupting the malfunction diagnosis. After the interruption of the malfunction diagnosis, when the first tool 60 resends the diagnosis request frame for performing the malfunction diagnosis to the same target ECU, the diagnosis request frame is relayed to the target ECU and the malfunction diagnosis requested by the first tool 60 is started.

Thus, the malfunction diagnosis requested by the first tool 60 to each ECU 31, 32, 41, 42, 51 can be carried out with a higher priority without adding an additional control process to each ECU 31, 32, 41, 42, 51 for interrupting the malfunction diagnosis being carried out. Thus, a process in each ECU 31, 32, 41, 42, 51 can be simplified. Accordingly, it is possible to prevent the occurrence of situation where people wait for the diagnosis service of the vehicle at the dealership utility.

Other Embodiments

In the foregoing embodiment, the first to third LANs 30 to 50 and the transmission path 20 are configured as CAN. Alternatively, communication protocols other than CAN may be used. For example, other communication protocols, such as event driven architecture, FlexRay, Media Orinted Systems Transport (MOST), Ethernet (registered trademark) may be used as in-vehicle LAN. Further, the number of LANs may be different from the above-described configuration. With this configuration, advantages similar to the above-described advantages can be provided.

According to the communication standard of each of the first to third LANs 30 to 50 and the transmission path, the malfunction diagnosis instruction or a response to the malfunction diagnosis instruction may be configured as a message that has multiple frames. In this case, the central GW 10, similar to the foregoing embodiment, may perform the relay of the message and the arbitration process to provide advantages similar to above-described advantages.

In the foregoing embodiment, the data link connector 21 is positioned in the transmission path 20, which is connected to the central GW 10. As another example, the data link connector may be positioned in any one of the first to third LANs 30 to 50. Further, multiple data link connectors may be positioned in the transmission path 20 or in any one of the first to the third LANs 30 to 50, and multiple first tools 60 may be connected to respective data link connectors.

In the foregoing embodiment, the central GW 10 is described as an example of a specific device for the communication relay purpose. Alternatively, the functions carried out by the central GW 10 in the present disclosure may be embedded in a different ECU.

In the foregoing embodiment, one second tool 52 performs wireless communication with the center 70 for performing the malfunction diagnosis to the target ECU in response to a diagnosis request from the center 70. As another example, the second tool 52 may perform wireless communication with multiple centers 70, and each center 70 may independently requests the malfunction diagnosis to the target ECU.

As the ECUs that configure the on-board system, one or more different wireless communication devices having similar functions with the second tool 52 may be disposed in the on-board system. The second tool 52 and the wireless communication device may perform the wireless communication with a different center 70 or a different terminal (mobile phone or smart phone) in order to perform the diagnosis requested by the center or the terminal. The malfunction diagnosis to the ECU can be independently carried out in each of the second tool 52 and the wireless communication devices.

The second tool 52 and above-described one or more wireless communication devices can be treated as one second tool unit. Alternatively, above-described one or more wireless communication devices can be treated independently as a third tool, a fourth tool, and so on.

As described above, when the malfunction diagnosis can be performed by one or more first tools 60, or by one or more different tools, advantages similar to above-described advantages can be provided.

The foregoing embodiment discloses the arbitration process for giving a higher priority to the malfunction diagnosis requested by the first tool 60. For another example, when the center 70 performs a malfunction diagnosis having a higher priority than a priority of the malfunction diagnosis requested by the first tool 60, the malfunction diagnosis requested by the center 70 may be carried out with a higher priority by the arbitration process. With this configuration, the malfunction diagnosis having the higher priority can be promptly carried out.

In the foregoing embodiment, the first tool is provided by an external connection tool that temporarily connects with the gateway device 10 via the transmission path 20 in which the data link connector 21 is positioned and the second diagnosis purpose tool 52 is provided by a data communication module that is communicable with the center 70 via a wireless communication network. As another example, the first tool 60 may be provided by a data communication module, and the second tool 52 may be provided by an external connection tool.

In the present embodiment, the third and fourth communication portions 13, 15 function as a request receiving portion and a transmitting portion. The first to third communication portions 11 to 13 function as an outputting portion and a response receiving portion.

In the present embodiment, the process executed at S135 of the arbitration process for giving a higher priority to the malfunction diagnosis requested by the first tool 60 than the malfunction diagnosis requested by the second tool 52 functions as an arbitration portion.

The foregoing disclosure includes the following aspects.

According to an aspect of the present disclosure, a gateway device 10 includes a request receiving portion 13, 15, an outputting portion 11 to 13, a response receiving portion 11 to 13, a transmitting portion 13, 15, and an arbitration portion S135. The request receiving portion 13, 15 receives, from a first diagnosis purpose tool 60, 52, a first diagnosis request that requests an execution of a malfunction diagnosis to an electronic control unit 31, 32, 41, 42, 51 equipped to a vehicle. The request receiving portion 13, 15 further receives, from a second diagnosis purpose tool 52, a second diagnosis request that requests an execution of a malfunction diagnosis to the electronic control unit 31, 32, 41, 42, 51. One of the first diagnosis purpose tool 60, 52 or the second diagnosis purpose tool 60, 52 is defined as a prioritized tool and a remaining one of the first diagnosis purpose tool 60, 52 or the second diagnosis purpose tool 60, 52 being defined as a non-prioritized tool. The prioritized tool has a priority higher than a priority of the non-prioritized tool. One of the first diagnosis request or the second diagnosis request output from the prioritized tool is defined as a prioritized diagnosis request and a remaining one of the first diagnosis request or the second diagnosis request output from the non-prioritized tool is defined as a non-prioritized diagnosis request. The outputting portion 11 to 13 outputs the first diagnosis request and the second diagnosis request received by the request receiving portion 13, 15 to an in-vehicle local area network 30, 40, 50 to which the electronic control unit 31, 32, 41, 42, 51 is connected. The response receiving portion 11 to 13 receives a first diagnosis response and a second diagnosis response, the first diagnosis response is output from the electronic control unit 31, 32, 41, 42, 51 to the in-vehicle local area network 30, 40, 50 as a response to the first diagnosis request, and the second diagnosis response is output from the electronic control unit 31, 32, 41, 42, 51 to the in-vehicle local area network 30, 40, 50 as a response to the second diagnosis request. One of the first diagnosis response or the second diagnosis response output as a response to the prioritized diagnosis request is defined as a prioritized diagnosis response and a remaining one of the first diagnosis response or the second diagnosis response output as a response to the non-prioritized diagnosis request is defined as a non-prioritized diagnosis response. The transmitting portion transmits the first diagnosis response to the first diagnosis purpose tool as the response to the first diagnosis request and transmits the second diagnosis response to the second diagnosis purpose tool as the response to the second diagnosis request. When the request receiving portion receives the non-prioritized diagnosis request from the non-prioritized tool for the execution of the malfunction diagnosis to the electronic control unit at a previous time and receives the prioritized diagnosis request from the prioritized tool for the execution of the malfunction diagnosis to the electronic control unit before an end of the malfunction diagnosis requested by the non-prioritized tool at the previous time, the arbitration portion controls the outputting portion to cancel an output of the non-prioritized diagnosis request and controls the transmitting portion to cancel a transmission of the non-prioritized diagnosis response to the non-prioritized tool.

For example, the diagnosis request or the diagnosis response may be configured as single frame or as a message including multiple frames. Herein, frame is a unit of data that is output to the in-vehicle LAN at one time transceiving.

Suppose that each of the ECUs 31, 32, 41, 42, 51 in the present embodiment has a configuration based on the first come first processed rule and the target ECU receives the diagnosis request from the prioritized tool for starting a new malfunction diagnosis during a current malfunction diagnosis, which is being carried out by the non-prioritized tool to the same target ECU. In this case, since transceiving of all of the diagnosis purpose frames used for the malfunction diagnosis by the non-prioritized tool has not been ended, the target ECU cannot start the malfunction diagnosis in response to the diagnosis request transmitted from the prioritized tool.

According to the gateway device 10 in the present embodiment, when the target ECU receives the diagnosis request from the prioritized tool for starting a new malfunction diagnosis during a current malfunction diagnosis to the same target ECU by the non-prioritized tool, the relay of the diagnosis purpose frame between the non-prioritized tool and the target ECU is interrupted. With this configuration, the communication between the target ECU and the non-prioritized tool is disabled, and the target ECU is able to receive the new diagnosis request from the prioritized tool.

With above-described configuration, the malfunction diagnosis being carried out by the non-prioritized tool is forcibly interrupted by the arbitration of the gateway device 10 without adding an additional control process to each of the ECUs 31, 32, 41, 42, 51 for interrupting the malfunction diagnosis. With this configuration, the malfunction diagnosis by the non-prioritized tool is ended earlier compared with a case where the arbitration is not carried out. Further, when the prioritized tool transmits the diagnosis request to the same target ECU again, the diagnosis request is relayed to the target ECU and the malfunction diagnosis requested by the prioritized tool can be started promptly.

As another configuration example, during the malfunction diagnosis to the target ECU by the non-prioritized tool, when the gateway device 10 receives the diagnosis request from the prioritized tool, the gateway device 10 may transmit a command that requests for a resending of the diagnosis request to the prioritized tool. With this configuration, the diagnosis request from the prioritized tool can be resent to the gateway device 10. Further, the prioritized tool may have a resending function that resends the diagnosis request to the target ECU. The prioritized tool may also be configured to resend the diagnosis request regardless of a receiving of the resend command from the gateway device.

With the gateway device 10 according to the present embodiment, the malfunction diagnosis requested by a specific diagnosis purpose tool can be given a higher priority than other diagnosis purpose tools without adding additional control process to each of the ECUs 31, 32, 41, 42, 51.

While the disclosure has been described with reference to preferred embodiments thereof, it is to be understood that the disclosure is not limited to the preferred embodiments and constructions. The disclosure is intended to cover various modification and equivalent arrangements. In addition, while the various combinations and configurations, which are preferred, other combinations and configurations, including more, less or only a single element, are also within the spirit and scope of the disclosure.

The invention claimed is:

1. A gateway device comprising:
a controller, having a processor and memory, configured to:
receive, from a first diagnosis purpose tool, a first diagnosis request that requests an execution of a malfunction diagnosis to an electronic control unit equipped to a vehicle, and receive, from a second diagnosis purpose tool, a second diagnosis request that requests an execution of a malfunction diagnosis to the electronic control unit, one of the first diagnosis purpose tool or the second diagnosis purpose tool being defined as a prioritized tool and a remaining one of the first diagnosis purpose tool or the second diagnosis purpose tool being defined as a non-prioritized tool, the prioritized tool having a priority higher than a priority of the non-prioritized tool, one of the first diagnosis request or the second diagnosis request output from the prioritized tool being defined as a prioritized diagnosis request and a remaining one of the first diagnosis request or the second diagnosis request output from the non-prioritized tool being defined as a non-prioritized diagnosis request;
output the first diagnosis request and the second diagnosis request received by the controller to an in-vehicle local area network to which the electronic control unit is connected;
receive a first diagnosis response and a second diagnosis response, the first diagnosis response being output from the electronic control unit to the in-vehicle local area network as a response to the first diagnosis request, the second diagnosis response being output from the electronic control unit to the in-vehicle local area network as a response to the second diagnosis request, one of the first diagnosis response or the second diagnosis response output as a response to the prioritized diagnosis request being defined as a prioritized diagnosis response and a remaining one of the first diagnosis response or the second diagnosis response output as a response to the non-prioritized diagnosis request being defined as a non-prioritized diagnosis response;

transmit the first diagnosis response to the first diagnosis purpose tool as the response to the first diagnosis request and transmit the second diagnosis response to the second diagnosis purpose tool as the response to the second diagnosis request;

wherein, when the controller receives the non-prioritized diagnosis request from the non-prioritized tool for the execution of the malfunction diagnosis to the electronic control unit at a previous time period prior to receiving the prioritized diagnosis request and receives the prioritized diagnosis request from the prioritized tool for the execution of the malfunction diagnosis to the electronic control unit before an end of the malfunction diagnosis requested by the non-prioritized tool at the previous time, the controller terminates a diagnostic operation requested by the non-prioritized tool by cancelling an output of the non-prioritized diagnosis request or cancelling a transmission of the non-prioritized diagnosis response to the non-prioritized tool, wherein the first diagnosis purpose tool and the second diagnosis purpose tool are communicably connected with the gateway device via the in-vehicle local area network, and the arbitration portion is disposed in the gateway device.

2. The gateway device according to claim 1, wherein the first diagnosis purpose tool is provided by an external connection tool that temporarily connects with the gateway device, and the second diagnosis purpose tool is provided by communication device, which is wirelessly communicable with an external center or with an external device.

3. The gateway device according to claim 2, wherein the external connection tool is provided as the prioritized tool and the communication device is provided as the non-prioritized tool.

4. The gateway device according to claim 2, wherein the communication device is provided as the prioritized tool and the external connection tool is provided as the non-prioritized tool.

* * * * *